(12) United States Patent
Liu et al.

(10) Patent No.: US 9,621,363 B2
(45) Date of Patent: Apr. 11, 2017

(54) METHOD, SYSTEM, AND APPARATUS FOR IMPLEMENTING MULTICAST ON SHARED NETWORK

(71) Applicant: HUAWEI TECHNOLOGIES CO., LTD., Shenzhen (CN)

(72) Inventors: Feng Liu, Xi'an (CN); Lei Fei, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 332 days.

(21) Appl. No.: 14/192,212

(22) Filed: Feb. 27, 2014

(65) Prior Publication Data
US 2014/0177632 A1 Jun. 26, 2014

Related U.S. Application Data

(63) Continuation of application No. PCT/CN2011/079158, filed on Aug. 31, 2011.

(51) Int. Cl.
*H04L 12/28* (2006.01)
*H04L 12/56* (2006.01)
(Continued)

(52) U.S. Cl.
CPC ............ *H04L 12/18* (2013.01); *H04L 12/185* (2013.01); *H04L 65/4076* (2013.01); *H04L 65/4084* (2013.01); *H04N 21/6405* (2013.01)

(58) Field of Classification Search
CPC ... H04L 12/18; H04L 12/185; H04L 65/4076; H04L 65/4084; H04N 21/6405
See application file for complete search history.

(56) References Cited

U.S. PATENT DOCUMENTS 7,864,767 B2 * 1/2011 Jang ..................... H04N 21/235
 370/390
2003/0106065 A1 6/2003 Sakai et al.
(Continued)

FOREIGN PATENT DOCUMENTS

CN 1744570 3/2006
CN 1859284 11/2006
(Continued)

OTHER PUBLICATIONS

International Search Report issued on Jun. 7, 2012 in corresponding International Application No. PCT/CN2011/079158.
(Continued)

*Primary Examiner* — Lonnie Sweet
(74) *Attorney, Agent, or Firm* — Staas & Halsey LLP

(57) ABSTRACT

The present invention discloses a method for implementing multicast on a shared network, which includes receiving a multicast program request from a terminal device; updating an entry corresponding to the multicast program requested by the terminal device in a table of correspondence between multicast program information and terminal device identifiers according the multicast program request, where the table of correspondence between multicast program information and terminal device identifiers includes a plurality of relation entries, and each entry corresponds to a different multicast program and includes identifier information of terminal devices that request the multicast program; and providing the multicast program and the identifier information of terminal devices in the updated relation entry for each terminal device in the broadcast manner, where the identifier information of terminal devices is used to indicate whether each terminal device needs to receive the multicast program.

16 Claims, 7 Drawing Sheets

(51) Int. Cl.
*H04L 12/18* (2006.01)
*H04N 21/6405* (2011.01)
*H04L 29/06* (2006.01)

(56) References Cited

U.S. PATENT DOCUMENTS

| | | |
|---|---|---|
| 2005/0025082 A1 | 2/2005 | Jang et al. |
| 2008/0155612 A1 | 6/2008 | Ikeda et al. |
| 2008/0239957 A1* | 10/2008 | Tokura ............... H04L 12/5695 370/235 |
| 2011/0265132 A1 | 10/2011 | Wang et al. |

FOREIGN PATENT DOCUMENTS

| | | |
|---|---|---|
| CN | 1860738 | 11/2006 |
| CN | 101047881 | 10/2007 |
| CN | 101166265 | 4/2008 |
| CN | 101364888 | 2/2009 |
| CN | 101867778 | 10/2010 |
| CN | 102014317 | 4/2011 |
| EP | 1 768 413 A2 | 3/2007 |

OTHER PUBLICATIONS

Extended and Supplementary European Search Report issued on Oct. 9, 2014 in corresponding European Patent Application No. 11860674.8.
Chinese Office Action mailed Aug. 5, 2013 in corresponding Chinese Patent Application No. 201180001943.0.
PCT International Search Report and Written Opinion of the International Searching Authority dated Jun. 7, 2012 in corresponding International Patent Application No. PCT/CN2011/079158.
Chinese Search Report dated Jun. 25, 2013 in corresponding Chinese Patent Application No. 2011800019430.

* cited by examiner

| DMAC | SMAC | Packet type: 0x0800 | IP header: 224.1.1.10 | Data | Cyclic redundancy check code |

| Multicast flag: 0xAA | Terminal ID mask information: 0b'0000 0001 | DMAC | SMAC | Packet type: 0x0800 | IP header: 224.1.1.10 | Data | Cyclic redundancy check code |

| Multicast flag | Multicast program number | Terminal ID mask information |
|---|---|---|

FIG. 7

| Multicast flag | Multicast program number | Length | Terminal ID |
|---|---|---|---|

FIG. 8

| Multicast flag | Multicast program number | DMAC | SMAC | Packet type | Multicast data | Cyclic redundancy check code |
|---|---|---|---|---|---|---|

FIG. 9

| Multicast flag: 0xAA | Multicast program number 1 | Terminal ID mask information: 0b'0000001 |

METHOD, SYSTEM, AND APPARATUS FOR IMPLEMENTING MULTICAST ON SHARED NETWORK

CROSS-REFERENCE TO RELATED APPLICATIONS

This application is a continuation of International Application No. PCT/CN2011/079158, filed on Aug. 31, 2011, which is hereby incorporated by reference in its entirety.

TECHNICAL FIELD

The present invention mainly relates to shared network technologies, and in particular, to a method, a system, and an apparatus for implementing multicast on a shared network.

BACKGROUND

On a shared network, an office device manages a plurality of terminal devices, and all terminal devices on the network share the network resources of the office device. All terminal devices are managed by the office device in a unified manner, and only a terminal device that passes the authentication by the office device can take part in service processing.

When carrying out multicast services on a shared network, generally the office device is used to copy multicast program video streams to implement multicast in the prior art. The specific scheme is as follows: Based on IGMP (Internet Group Management Protocol, Internet group management protocol) multicast protocol, the office device may identify how many users have requested playing of a same multicast program currently, copy the multicast program video streams to create a plurality of copies of the multicast program video streams according to the number of users who request playing of the multicast program, and provide copies of the multicast program video streams to a terminal device of each user that requests playing of the multicast program respectively through the shared network. In fact, this method implements multicast by bearing multicast packets in the unicast manner.

But in the foregoing method for implementing multicast on a shared network, every time a user adds a play request for a same multicast program, the office device needs to create one more copy of the multicast program video streams and provide the version for a terminal device of the user through the shared network, which occupies a large part of downlink bandwidth.

SUMMARY

Embodiments of the present invention provide a method, a system and an apparatus for implementing multicast on a shared network to solve the problem of occupying a large part of bandwidth by multicast services in the prior art.

An embodiment of the present invention provides a method for implementing multicast on a shared network, including: receiving a multicast program request from a terminal device; updating an entry corresponding to the multicast program requested by the terminal device in a table of correspondence between multicast program information and terminal device identifiers according the multicast program request, where the table of correspondence between multicast program information and terminal device identifiers includes a plurality of relation entries, and each entry corresponds to a different multicast program and includes identifier information of terminal devices that request the multicast program; and providing the multicast program and the identifier information of terminal devices in the updated relation entry for each terminal device in the broadcast manner, where the identifier information of terminal devices is used to indicate whether each terminal device needs to receive the multicast program.

An embodiment of the present invention provides a system for implementing multicast on a shared network, including: an office device, configured to update an entry corresponding to a multicast program requested by a terminal device in a table of correspondence between multicast program information and terminal device identifiers according a multicast program request from the terminal device, where the table of correspondence between multicast program information and terminal device identifiers includes a plurality of relation entries, and each entry corresponds to a different multicast program and includes identifier information of terminal devices that request the multicast program, and to provide the multicast program and the identifier information of terminal devices in the updated entry for each terminal device in the broadcast manner, where the identifier information of terminal devices is used to indicate whether each terminal device needs to receive the multicast program; and a terminal device, configured to determine whether it needs to receive a multicast program provided by the office device in the broadcast manner according to the identifier information of terminal devices provided by the office device.

An embodiment of the present invention provides an apparatus for implementing multicast on a shared network, including: a receiving module, configured to receive a multicast program request from a terminal device; an entry maintenance module, configured to update an entry corresponding to the multicast program requested by the terminal device in a table of correspondence between multicast program information and terminal device identifiers according the multicast program request, where the table of correspondence between multicast program information and terminal device identifiers includes a plurality of relation entries, and each entry corresponds to a different multicast program and includes identifier information of terminal devices that request the multicast program; and a sending module, configured to provide the multicast program and the identifier information of terminal devices in the updated entry for each terminal device in the broadcast manner, where the identifier information of terminal devices is used to indicate whether each terminal device needs to receive the multicast program.

The method, system, and apparatus for implementing multicast on a shared network send a multicast program downstream from an office device to each terminal device in the broadcast manner. Because multicast program packets do not need to be copied in the broadcast manner, the bandwidth occupied by the multicast program packets sent downstream is greatly reduced.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following descriptions show merely some descriptions of the prior art and embodiments of the present invention, and a person of ordinary skill in the art may still derive other drawings from the accompanying drawings without creative efforts.

FIG. 1 is a schematic architectural diagram of a shared network;

FIG. 7 is an optional schematic structural diagram of a multicast notification packet in the method for implementing multicast on a shared network in FIG. 6;

FIG. 8 is another optional schematic structural diagram of a multicast notification packet in the method for implementing multicast on a shared network in FIG. 6;

FIG. 9 is a schematic structural diagram of a multicast data packet sent by an office device to a terminal device in the broadcast manner in the method for implementing multicast on a shared network in FIG. 6;

DESCRIPTION OF EMBODIMENTS

Figure 1:
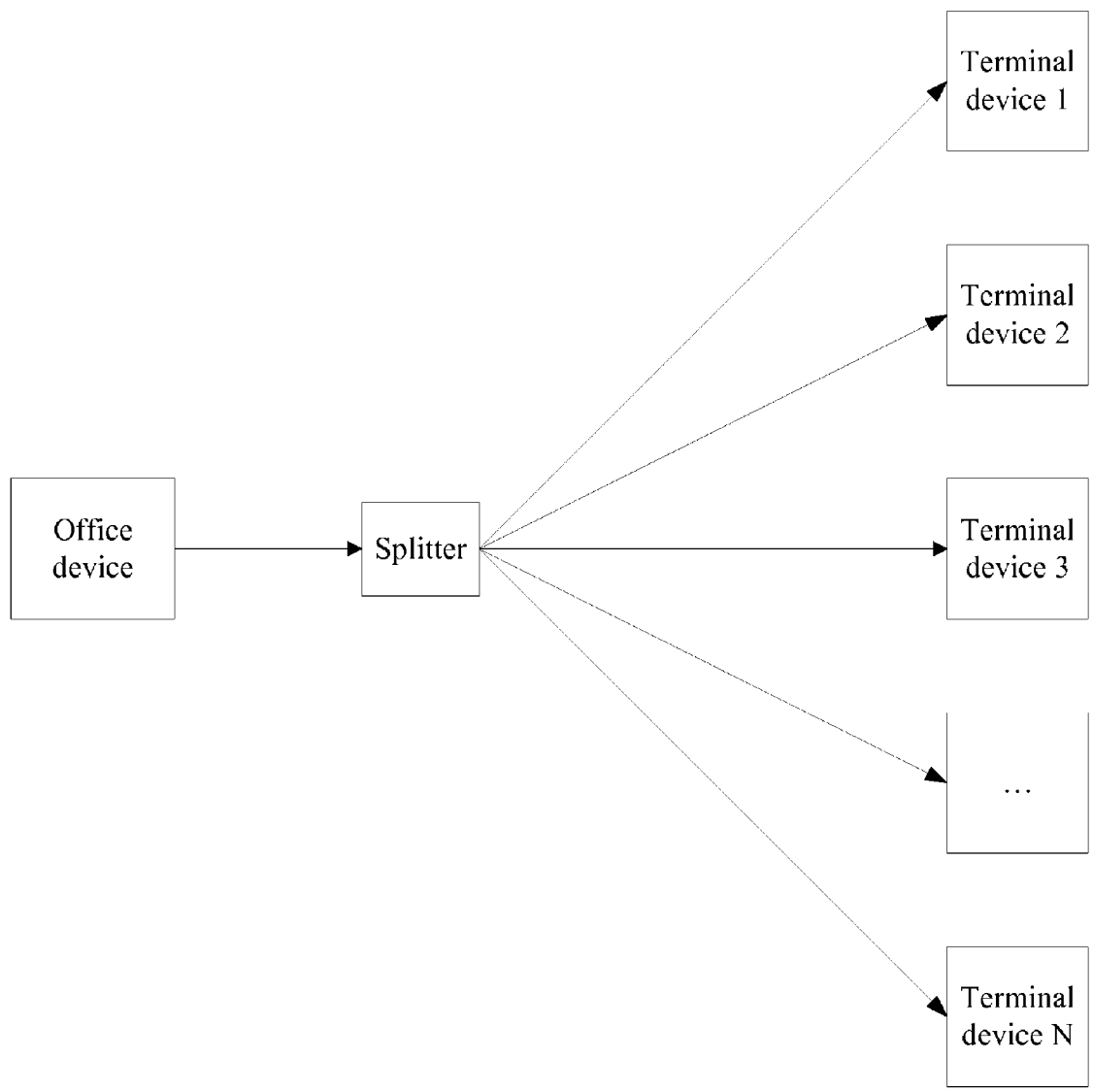

The following clearly describes the technical solutions in the embodiments of the present invention with reference to the accompanying drawings in the embodiments of the present invention. Apparently, the described embodiments are merely a part rather than all of the embodiments of the present invention. Other embodiments obtained by a person of ordinary skill in the art based on the embodiments of the present invention without creative efforts shall fall within the protection scope of the present invention.

An embodiment of the present invention provides a method for implementing multicast on a shared network to solve the problem of occupying a large part of bandwidth by multicast service implementation in the prior art. The method in an embodiment includes: receiving, by an office device, a multicast program request from a terminal device; updating, by the office device, an entry corresponding to the multicast program requested by the terminal device in a table of correspondence between multicast program information and terminal device identifiers according to the multicast program request, where the table of correspondence between multicast program information and terminal device identifiers includes a plurality of entries, and each entry corresponds to a different multicast program and includes identifier information of terminal devices that request the multicast program; and providing, by the office device, the multicast program requested by the terminal device and the identifier information of terminal devices in the updated entry for each terminal device in the broadcast manner, where the identifier information of terminal devices is used to indicate whether each terminal device needs to receive the multicast program.

Specifically, the identifier information of terminal devices is the only information that may uniquely identify a terminal device, such as terminal ID mask information; the terminal ID mask information includes a plurality of bits that respectively corresponds to different terminal devices on the shared network, where each bit is used to indicate whether a corresponding terminal device has requested playing of the multicast program.

In an embodiment, the office device may add terminal ID mask information corresponding to the multicast program in the updated entry to a multicast data packet that bears the multicast program, and provide the multicast data packet with the terminal ID mask information added for each terminal device in the broadcast manner.

In another embodiment, the terminal ID mask information and the multicast program are respectively borne in a multicast user notification packet that carries a multicast program number and in multicast data packets, and are sent to each terminal device in the broadcast manner.

For example, the office device may: number all multicast programs in a unified manner, so that each multicast program has a unique multicast program number; encapsulate the multicast program number of the multicast program and the terminal ID mask information corresponding to the multicast program in the updated entry in a multicast user notification packet, and send the multicast user notification packet to each terminal device in the broadcast manner; add the multicast program number to a multicast data packet that bears the multicast program, and send the multicast data packet to each terminal device in the broadcast manner. The multicast user notification packet is sent to each terminal device periodically in the broadcast manner or is sent to each terminal device in real time in the broadcast manner when an entry in the table of correspondence between multicast program information and terminal device identifiers is updated.

Furthermore, the method may further include adding, by the office device, a preset multicast flag to the multicast data packet, where the multicast flag is predefined by the terminal devices and the office device and is used to indicate that a packet that contains the multicast flag is a multicast packet.

A method for implementing multicast according to an embodiment of the present invention may be applied to the shared network shown in FIG. 1. The shared network may be an EOC (Ethernet over Coaxial Cable, Ethernet over coaxial cable) network, a PON (Passive Optical Network, passive optical network), or other point-to-multipoint shared networks, which include an office device and a plurality of terminal devices, where the office device is connected to the plurality of terminal devices in the point-to-multipoint manner through the splitter. If the shared network is the EOC network, a cable (Cable) is used as transmission media between the office device and the terminal devices, and if the shared network is the PON, a fiber (Fiber) is used as transmission media between the office device and the terminal devices.

In an embodiment of the present invention, an office device may maintain therein a table of correspondence between multicast program information and terminal device identifiers, which is used to indicate the correspondence between information of each multicast program and identifiers of terminal devices that request playing of the multicast program, and the office device may update the related entry in the correspondence table when a terminal device requests playing of a multicast program, and add terminal ID mask information to a multicast data packet sent to the terminal devices in the broadcast manner according to the correspondence entry of the multicast program to indicate whether each terminal device needs to receive the multicast data packet.

Figure 2:
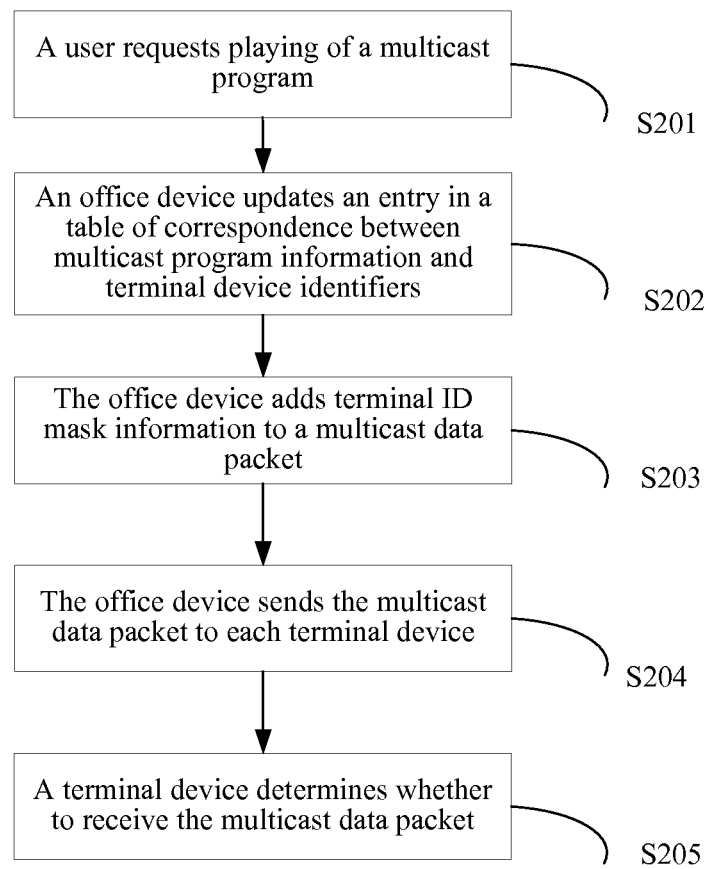
FIG. 2 is a flowchart of a method for implementing multicast on a shared network according to an embodiment of the present invention.

According to an embodiment of the present invention, a method for implementing multicast on a shared network may be shown in FIG. 2. The method may include:

S201: A user requests playing of a multicast program by using a terminal device, and the terminal device sends a multicast program request corresponding to the multicast program to an office device, where the multicast program request may include a terminal device identifier and multicast program information.

On the shared network shown in FIG. 1, the office device manages a plurality of terminal devices, maintains terminal device authentication information, and assigns a terminal ID to each terminal respectively, where the terminal ID may be used to uniquely identify a corresponding terminal device. In an embodiment, the terminal device identifier that the multicast program request carries may be the terminal ID of the terminal device.

Additionally, the multicast program information may be the multicast program address corresponding to the multicast program whose playing is requested by the user, or, in an alternate embodiment, an office device may preset numbers for multicast programs in a unified manner, where the multicast program information may also be the multicast program number corresponding to the multicast program whose playing is requested by the user.

S202: After receiving the multicast program request, the office device updates a related entry in the table of correspondence between multicast program information and terminal device identifiers, which is maintained by the office device, according to the multicast program request.

In a specific embodiment, the office device may maintain therein a table of correspondence between multicast program information and terminal device identifiers, where the table of correspondence between multicast program information and terminal device identifiers is used to indicate the correspondence between information of each multicast program and identifiers of terminal devices that request playing of the multicast program, and therefore may also be called a table of multicast program play requests. The table of correspondence between multicast program information and terminal device identifiers may include a plurality of entries, where each entry corresponds to a multicast program respectively, and may include multicast program information, such as a multicast program address and a multicast program number, and identifier information of terminal devices that request playing of the multicast program, such as terminal ID mask information.

It is assumed that the shared network has N terminal devices (respectively recorded as a terminal device 1 to a terminal device N), and the terminal ID mask information may be an information item that contains at least N bits (bit), where each bit of the terminal ID mask information may respectively correspond to a terminal device on the shared network. For example, bit0 stands for the terminal device 1, bit 1 stands for a terminal device 2, and so on. And, in the entry, each bit value in the terminal ID mask information may be used to indicate whether the terminal device corresponding to the bit has requested playing of the multicast program. For example, in a specific embodiment, if the office device on the shared network can manage 64 terminal devices (values of terminal IDs are respectively 0 to 63), the terminal ID mask information may include 64 bits (that is 8 bytes), and if a bit in the terminal ID mask information is set to 1, it indicates that the terminal device corresponding to the bit has requested playing of the multicast program of the entry.

In an embodiment, entries in the table of correspondence between multicast program information and terminal device identifiers may indicate the play request condition of all multicast programs. If no terminal device requests playing of a current multicast program, all values in the terminal ID mask information in the entry corresponding to the multicast program are 0. For example, if on the current shared network, when a terminal device 1 and a terminal device 4 request playing of a multicast program 1, a terminal device 2 and a terminal device 7 request playing of a multicast program 2, a terminal device 5, a terminal device 6, and a terminal device 8 request playing of a multicast program M, but no terminal device requests to a multicast program 3, Table 1 schematically shows the table of correspondence between multicast program information and terminal device identifiers.

TABLE 1

| Multicast program 1 | 0b'00001001 |
| Multicast program 2 | 0b'01000010 |
| Multicast program 3 | 0b'00000000 |
| ... | ... |
| Multicast program M | 0b' 10110000 |

In step S202, after receiving the multicast program request sent from the terminal device, the office device may find the entry corresponding to the multicast program by querying the table of correspondence between multicast program information and terminal device identifiers, and modify the terminal ID mask information in the entry corresponding to the multicast program so that the terminal ID mask information indicates that playing of the multicast program has been requested by the terminal device.

For example, if in step S201, the terminal device is a terminal device 3 (that is the terminal device ID is 2), and the multicast program requested by the terminal device is a multicast program 2, in step S202, after the office device receives the multicast program request about the multicast program 2 sent from the terminal device 3, the office device queries the table of correspondence between multicast program information and terminal device identifiers, finds the entry corresponding to the multicast program 2, and sets the value of bit3 indicating the terminal device 3 to 1 in the terminal ID mask information of the entry according to the multicast program request, so that the terminal ID mask information is updated from 0b'01000010 to 0b'01000110. Table 2 shows the updated entry, which may indicate that the terminal device 2, terminal device 3, and terminal device 7 have requested playing of the multicast program 2.

TABLE 2

| Multicast program 2 | 0b'01000110 |

Alternatively, in another embodiment, an entry in the table of correspondence between multicast program information and terminal device identifiers may indicate only the condition of multicast programs whose playing has been requested by terminal devices, where if no terminal device requests playing of a current multicast program, the table of correspondence between multicast program information and terminal device identifiers may not contain an entry corresponding to the multicast program.

Correspondingly, in step S202, after receiving the multicast program request from the terminal device, the office device may firstly query whether the table of correspondence between multicast program information and terminal device identifiers contains an entry corresponding to the multicast program, and determines whether other terminal devices that have requested playing of the multicast program exist on the shared network. If no other terminal devices that have requested playing of the multicast program exist, that is, the multicast program is a multicast program whose playing is newly requested, the office device then generates a new entry corresponding to the multicast program whose playing is newly requested. If other terminal devices that have requested playing of the multicast program exist, the office device then modifies the terminal ID mask information in the entry corresponding to the multicast program.

For example, if in step S201, the multicast program whose playing is requested by the terminal device 3 is the multicast program 3, and the office device queries the table of correspondence between multicast program information and terminal device identifiers and finds that no entry corresponds to the multicast program 3, the office device may determine that no other terminal devices have requested playing of the multicast program 3, generate the following new entry shown in Table 3, and add the new entry to the table of correspondence between multicast program information and terminal device identifiers to update the correspondence table.

TABLE 3

| Multicast program 3 | 0b'00000100 |
|---|---|

S203: The office device adds, according to the updated entry of the correspondence between the multicast program information and the terminal device identifiers, terminal ID mask information of a terminal device that requests playing of the multicast program to the header of the multicast data packet that bears the multicast program.

Specifically, after receiving the multicast data packet that bears the multicast program content, the office device may firstly query the updated table of correspondence between multicast program information and terminal device identifiers, and obtain terminal ID mask information of the terminal device that requests playing of the multicast program from the entry corresponding to the multicast program, and then add the terminal ID mask information to the header of the multicast data packet, where the terminal ID mask information may be used to indicate whether the terminal device on the shared network needs to receive the multicast data packet.

Optionally, in an embodiment, when adding the terminal ID mask information, the office device may further add a preset multicast flag to the header of a multicast data packet at the same time. The multicast flag may be used to indicate that the packet is a multicast data packet, and be predefined by the office device and the terminal devices by using protocols. For example, the multicast flag may be defined as 0XAA.

Additionally and optionally, in a specific embodiment, when receiving a multicast data packet from the upper-layer network and before adding the terminal ID mask information, the office device may further firstly determines whether a terminal device that requests playing of the multicast program borne in the multicast data packet exists according to the table of correspondence between multicast program information and terminal device identifiers. If determining that no terminal device requests playing of the multicast program, for example, no entry corresponding to the multicast program is found or all values in the terminal ID mask information in the entry corresponding to the multicast program are 0, the office device may directly discard the multicast data packet.

S204: The office device sends the multicast data packet to each terminal device.

For example, the office device may send the multicast data packet with the terminal ID mask information added to all terminal devices on the shared network in the broadcast manner.

S205: Each terminal device determines whether to receive the multicast data packet according to terminal ID mask information in the header of the multicast data packet.

For example, each terminal device may find a bit corresponding to the terminal device from the terminal ID mask information, and directly determines whether the terminal device needs to receive the multicast data packet according to the bit. When the bit is set to 1, the terminal device determines that the multicast data packet bears the multicast program requested by the terminal device, and therefore the terminal device receives the multicast data packet and obtains multicast data from the packet. When the bit is set to 0, the terminal device determines that it does not need to receive the multicast data packet, and therefore directly discards the multicast data packet.

Additionally, in a specific embodiment, if the office device adds the multicast flag to a multicast data packet at the same time after receiving the multicast data packet, each terminal device may determine, according to whether the packet carries the multicast flag, whether the packet is a multicast data packet after receiving the packet from the office device in the broadcast manner. If only after determining that the packet is a multicast data packet, the terminal device further obtains terminal ID mask information carried in the header of the packet, and determines whether to discard the packet. Otherwise, the terminal device directly receives the packets.

It may be seen that, in the method for implementing multicast according to this embodiment, the office device uses the manner of downstream broadcast on a shared network to provide the multicast data packet for all terminal devices, and adds terminal ID mask information to the multicast data packet to indicate whether a terminal device needs to receive the multicast data packet, thereby avoiding the copy of the multicast data packet and greatly reducing the downstream bandwidth occupied by multicast services. Additionally, a terminal device may directly determine whether it needs to receive the multicast data packet from the corresponding bit in the terminal ID mask information to implement multicast, without performing a more complex protocol parsing and configuring a multicast filtering entry to implement multicast packet filtering. Therefore, the method for implementing multicast according to this embodiment may further reduce the software and hardware complexity of a terminal device and reduce the implementation costs on the terminal device.

For better understanding of the foregoing embodiment, the following further illustrates the method for implementing multicast on a shared network according to the embodiment of the present invention with reference to a specific application example.

Figures 3, 4, 5:
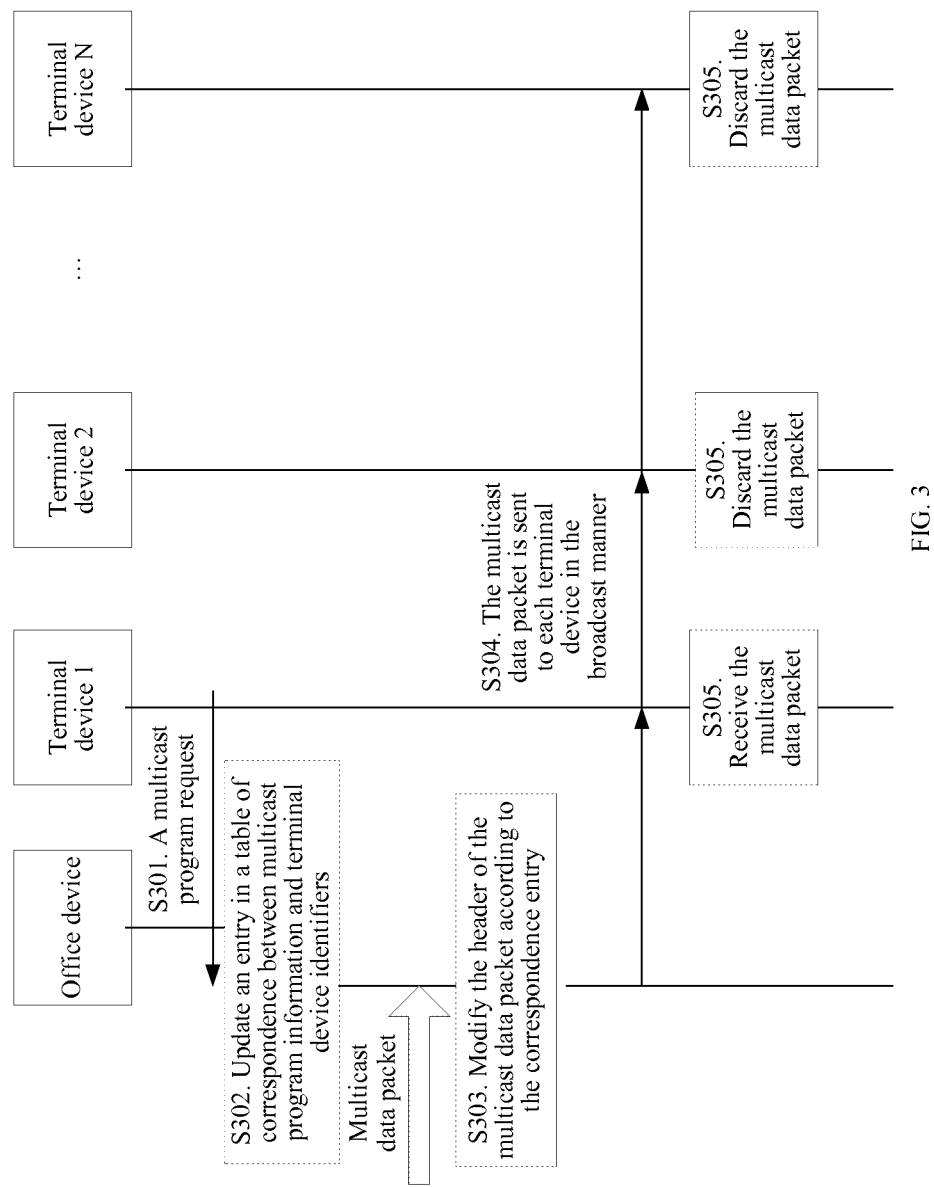
FIG. 3 is a signaling exchange diagram of a specific application example of the method for implementing multicast on a shared network in FIG. 2.
FIG. 4 is a schematic structural diagram of a multicast data packet received by an office device in a method for implementing multicast on a shared network according to an embodiment of the present invention.
FIG. 5 is a schematic structural diagram of a multicast data packet sent by an office device to terminal devices in the broadcast manner in a method for implementing multicast on a shared network according to an embodiment of the present invention.

As shown in FIG. 3, a specific embodiment of the method for implementing multicast on a shared network according to the foregoing embodiment may include:

S301: A terminal device 1 requests playing of a multicast program with the address 224.1.1.10, and a multicast program request corresponding to the multicast program (such as an IGMP multicast join request packet) is sent by the terminal device 1 upstream to the office device.

In step S301, the multicast program request sent by the terminal device 1 may include the multicast program address 224.1.1.10 and the terminal ID of the terminal device 1. Other terminal devices (that is terminal devices 2 to N) do not request playing of the multicast program with the address 224.1.1.10, and therefore only the terminal device 1 sends the multicast program request to the office device. For ease of description, the following uses the multicast program (224.1.1.10) for the multicast program with the multicast program address 224.1.1.10.

S302: The office device captures the IGMP multicast join request packet of the terminal device 1 by processing the IGMP protocol, and updates the entry of the correspondence between the multicast program information and the terminal device identifiers according to the IGMP multicast join request packet.

The IGMP protocol is a protocol specified for multicast services, where when a user needs to watch a multicast program, an IGMP join packet is sent to the upper-layer multicast server, and the server determines that the user needs playing of the multicast program after receiving the packet and sends the program.

The office device may maintain a table of correspondence between multicast program information and terminal device identifiers, in which the foregoing multicast program is included. This application example describes an entry that includes a multicast program address and terminal ID mask information in the correspondence table as an example. In a specific application, an office device can manage 64 terminal devices, and the range of terminal device ID may be 0 to 63. Accordingly, 8 bytes are required to cover all the terminal devices. Therefore, after the user of the terminal device 1 requests playing of the multicast program (224.1.1.10), the entry corresponding to the multicast program on the office device may be updated to that shown in Table 4.

TABLE 4

| 224.1.1.10 | 0b' 0000 0001 |
|---|---|

In Table 4, 0b' indicates binary bits, and it may be seen that bit0 is set to 1, indicating that the terminal device 1 requests playing of the multicast program (224.1.1.10); the value 0 is retained for other bits in the entry, indicating that no other terminal devices request to the multicast program (224.1.1.10) at the same time.

S303: After receiving a multicast data packet of the multicast program (224.1.1.10), the office device adds the preset multicast flag 0xAA and the terminal ID mask information in the correspondence entry of the multicast program (224.1.1.10) to the header of the multicast data packet.

For example, FIG. 4 shows the multicast data packet before modification, which includes:

DMAC (Destination Media Access Control, destination media access control): indicates the destination MAC address.

SMAC (Source Media Access Control, source media access control): indicates the source MAC address.

Packet type: indicates the Ethernet packet type, which may be 0x0800.

Multicast data: may include an IP header (224.1.1.10) of the multicast program and specific data (DATA).

Cyclic redundancy check code: Cyclic Redundancy Check, that is, CRC.

FIG. 5 shows the multicast data packet after modification, where the preset multicast flag 0xAA and the terminal ID mask information of the multicast program (224.1.1.10), that is 0b'00000001, are added in the header of the multicast data packet. 0xAA is the multicast flag that is predefined by the office device and the terminal devices and is used to indicate a multicast data packet.

S304: The office device sends the multicast data packet with the modified header to each terminal device in the broadcast manner.

Because the broadcast manner is adopted, the multicast data packet is sent to all terminal devices on the shared network, which includes the terminal device 1 that requests playing of the multicast program (224.1.1.10) and terminal devices 2 to N that do not request playing of the multicast program (224.1.1.10).

S305: Each terminal device receives or discards the multicast data packet according to terminal ID mask information carried in the header of the multicast data packet.

Specifically, after the multicast data packet is sent to each terminal device, the terminal device receives the multicast data packet if the terminal device determines that the terminal ID mask corresponding to the terminal device is set to 1 according to the terminal ID mask information carried by the multicast data packet. Otherwise, the terminal device discards the multicast data packet. In this embodiment, the terminal ID mask information (0b'00000001) indicates that only the ID mask of the terminal device 1 is set to 1. Therefore, the terminal device 1 receives the multicast data packet and other terminal devices discard the multicast data packet.

In another embodiment of the present invention, an office device may also maintain therein a table of correspondence between multicast program information and terminal device identifiers, and update an entry related to a multicast program when a terminal device requests playing of the multicast program. The office device may send terminal ID mask information of the terminal device that requests playing of the multicast program to all terminal devices in the broadcast manner by sending a multicast user notification packet, so that the terminal ID mask information may indicate whether each terminal device needs to enable the receiving function for the multicast program.

Figure 6:
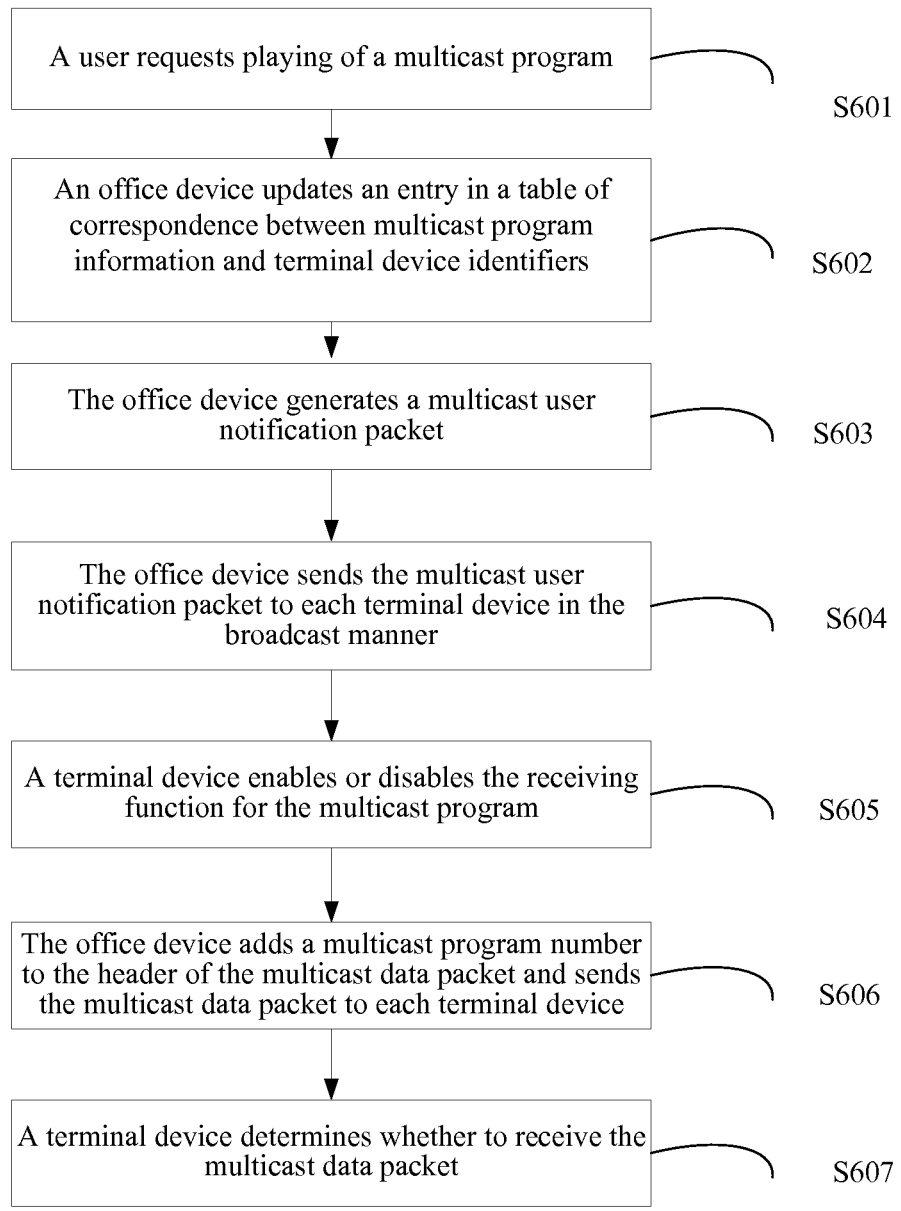
FIG. 6 is a flowchart of a method for implementing multicast on a shared network according to another embodiment of the present invention.

A method for implementing multicast on a shared network according to another embodiment of the present invention is shown in FIG. 6. The following describes steps different from those in FIG. 2 in detail, and for the same content as that in FIG. 2, refer to related description in the foregoing embodiment. The method includes:

S601: A user requests playing of a multicast program by using a terminal device, and the terminal device sends a multicast program request corresponding to the multicast program to an office device.

S602: After receiving the multicast program request, the office device updates a related entry in the table of correspondence between multicast program information and terminal device identifiers, which is maintained by the office device, according to the multicast program request.

What is the same as the foregoing embodiment is that each entry in the table of correspondence between multicast program information and terminal device identifiers maintained by the office device may respectively correspond to a multicast program, and may include multicast program information and terminal ID mask information of the terminal device that requests playing of the multicast program, where for the specific definition of the terminal ID mask information, reference may be made to the description in the foregoing embodiment.

S603: The office device generates, according to the updated entry of the correspondence between the multicast program information and the terminal device identifiers, a multicast user notification packet, where the multicast user notification packet may bear multicast program information and terminal ID mask information of the terminal device that requests playing of the multicast program.

In an embodiment, the office device may preset numbers to all multicast programs in a unified manner, and the multicast program information in the multicast user notification packet may be specific to the number of the multicast program. Additionally, the multicast user notification packet may further include a preset multicast flag, where the multicast flag may be predefined by the office device and the terminal devices jointly to indicate a multicast user notification packet. Specifically, the structure of the multicast user notification packet may adopt the mask flag method shown in FIG. 7. When the shared network includes 64 terminals, the multicast user notification packet may adopt a fixed 8 bytes to indicate the terminal ID mask information.

Alternatively, the multicast user notification packet may further indicate ID information of the terminal device that requests playing of the multicast program through the TLV (Type, Length and Value, type, length, value) structure, as shown in FIG. 8.

S604: The office device sends the multicast user notification packet to all terminal devices in the broadcast manner.

In a specific embodiment, the office device may generate the multicast user notification packet and send it to all terminal devices in the broadcast manner in real time when the entry in the table of correspondence between multicast program information and terminal device identifiers is updated, or the office device may also send the play request condition of a multicast program to all terminal devices in the broadcast manner by sending multicast user notification packets periodically.

S605: Each terminal device enables or disables the receiving function for the multicast program according to the multicast user notification packet.

Specifically, after receiving the multicast user notification packet, each terminal device may find a bit corresponding to the terminal device from the terminal ID mask information borne in the multicast user notification packet, and directly determines whether the terminal device needs to enable the receiving function for the multicast program according to the bit. When the bit is set to 1, the terminal device enables the receiving function for the multicast program corresponding to the multicast program number borne in the multicast user notification packet. When the bit is set to 0, the terminal device does not enable the receiving function for the multicast program corresponding to the multicast program number.

Alternatively, when the multicast user notification packet adopts the TLV structure to indicate the ID information of the terminal device that requests playing of the multicast program, each terminal device may determine whether to enable the receiving function for the multicast program corresponding to the multicast program number by comparing the current terminal device ID and the terminal ID information in the multicast user notification packet. If the two IDs are the same, the terminal device enables the receiving function for the multicast program; otherwise, the terminal device does not enable the receiving function for the multicast program.

S606: The office device adds the multicast program number to the header of a multicast data packet that bears the multicast program content, and sends the multicast data packet to each terminal device.

Specifically, after receiving a multicast data packet that bears the multicast program content, the office device may add the multicast program number of the multicast program to the header of the multicast data packet, as shown in FIG. 9. Additionally and optionally, when adding the terminal ID mask information, the office device may further add a preset multicast flag to the header of the multicast data packet at the same time. The multicast flag may be used to indicate that the packet is a multicast data packet.

Further, the office device may send the multicast data packet with the multicast program number added to all terminal devices on the shared network in the broadcast manner.

S607: Each terminal device determines whether to receive the multicast data packet according to multicast program number in the multicast data packet.

For example, each terminal device determines the number of the multicast program that it needs to receive according to the multicast user notification packet received in step S604. When the multicast data packet is sent to the terminal device, the terminal device may determine whether the multicast program number borne in the multicast data packet is the same as the multicast program number that the office device uses the multicast user notification packet to request the terminal device to receive. If the two numbers are the same, the terminal device receives the multicast data packet; otherwise, the terminal device discards the multicast data packet.

In the method for implementing multicast according to this embodiment, the office device uses the manner of downstream broadcast on a shared network to provide the multicast data packet for all terminal devices, and adds terminal ID mask information to the multicast user notification packet to indicate whether a terminal device needs to receive the multicast data packet with a specific multicast program number, thereby avoiding the copy of multicast data packets and greatly reducing the downstream bandwidth occupied by multicast services. Additionally, a terminal device may directly determine whether it needs to receive the multicast packet from the corresponding bit in the terminal ID mask information in the multicast user notification packet to implement multicast, without performing a more complex protocol parsing and configuring a multicast filtering entry to implement multicast packet filtering. Therefore, the method for implementing multicast according to this embodiment may further reduce the software and hardware complexity of a terminal device and reduce the implementation costs on the terminal device.

For better understanding of the foregoing embodiment of the present invention, the following further illustrates a method for implementing multicast on a shared network according to the foregoing embodiment of the present invention with reference to another specific application embodiment.

Figure 10:
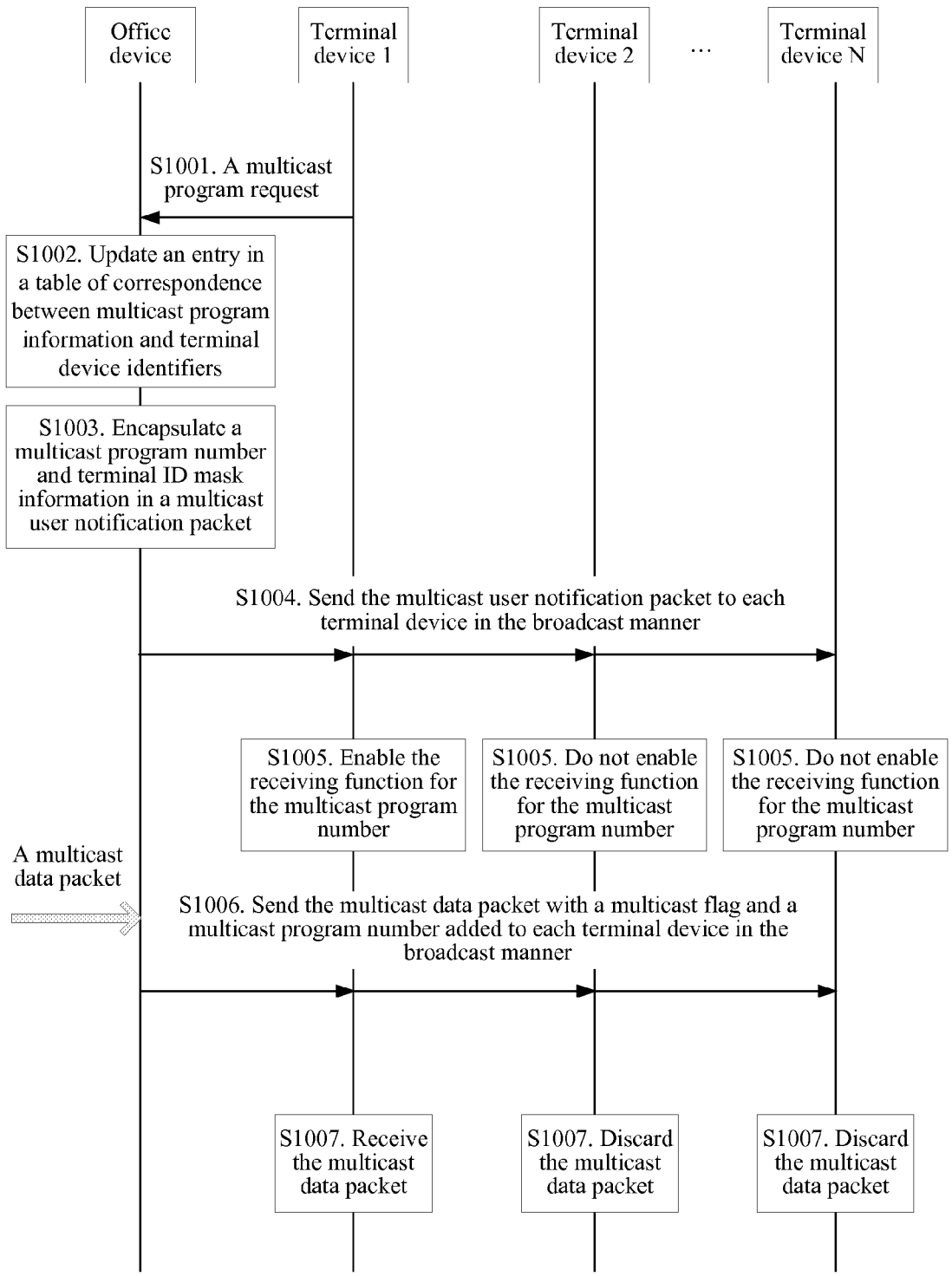
FIG. 10 is a signaling exchange diagram of a specific application example of the method for implementing multicast on a shared network in FIG. 6.

As shown in FIG. 10, a specific example of the method for implementing multicast on a shared network according to the foregoing embodiment may include:

S1001: A terminal device 1 requests playing of a multicast program with the address 224.1.1.10, and a multicast program request corresponding to the multicast program (such as an IGMP multicast join request packet) is sent by the terminal device 1 upstream to the office device.

S1002: The office device captures the IGMP multicast join request packet of the terminal device 1 by processing the IGMP protocol, and updates the entry of the correspondence between the multicast program information and the terminal device identifiers according to the IGMP multicast join request packet.

The office device may maintain a table of correspondence between multicast program information and terminal device identifiers, in which the foregoing multicast program is included. This application example describes an entry that includes a multicast program number and terminal ID mask information in the correspondence table as an example. If the multicast program number of the multicast program (224.1.1.10) is 1, and no other terminal devices request playing of the multicast program (224.1.1.10) before the terminal device 1 requests its playing, the terminal ID mask information in the entry before the update is 0b'00000000, and the updated terminal ID mask information is 0b'00000001.

S1003: The office device encapsulates the multicast program number and terminal ID mask information of the multicast program in a multicast user notification packet according to the updated entry of the correspondence between the multicast program information and the terminal device identifiers.

When the entry of the correspondence between the multicast program information and the terminal device identifiers is updated, the terminal device may generate a multicast user notification packet and encapsulate the multicast program number and terminal ID mask information of the multicast program in the multicast user notification packet. In this application example, the multicast program number corresponding to the multicast program with the multicast program address 224.1.1.10 is 1, the multicast program still uses 0xAA as the multicast flag, and the terminal ID mask information is 0b'00000001 because only the terminal device 1 requests playing of the multicast program (224.1.1.10). Therefore, the multicast user notification packet may be shown in FIG. 11.

S1004: The office device sends the multicast user notification packet that carries the number of the multicast program (224.1.1.10) and the corresponding terminal ID mask information to each terminal device in the broadcast manner.

Because the broadcast manner is adopted, the multicast user notification packet is sent to all terminal devices on the shared network, which includes the terminal device 1 that requests playing of the multicast program (224.1.1.10) and terminal devices 2 to N that do not request playing of the multicast program (224.1.1.10).

S1005: Each terminal device parses the multicast user notification packet after receiving it, gets the terminal ID mask information, and enables or disables the receiving function for the multicast program (224.1.1.10) according to the terminal ID mask information.

Specifically, each terminal device may find a bit corresponding to the terminal device from the terminal ID mask information, and directly determines whether the terminal device needs to enable the receiving function for the multicast program (224.1.1.10) according to whether the bit is set to 1. In this application example, after receiving the multicast user notification packet, the terminal device 1 determines that it needs to enable the receiving function for the multicast program with the multicast program number 1 from that bit0 in the terminal ID mask information 0b'00000001 is set to 1; but other terminal devices determine that they do not need to enable the receiving function for the multicast program with the multicast program number 1 from that the corresponding bit in the terminal ID mask information is set to 0.

S1006: The office device adds the preset multicast flag 0xAA and corresponding multicast program number 1 to the header of a multicast data packet that bears the multicast program (224.1.1.10), and sends the multicast data packet to each terminal device.

S1007: Each terminal device receives or discards the multicast data packet according to multicast program number carried in the header of the multicast data packet.

Specifically, after the multicast data packet is sent for each terminal device, the terminal device 1 determines that the multicast program number carried in the multicast data packet is the same as the program number in the multicast user notification packet that the terminal device 1 receives. Therefore, the terminal device 1 receives the multicast data packet, but other terminal devices discard the multicast data packet through similar determining Based on the method for implementing multicast on a shared network according to the foregoing embodiment, an embodiment of the present invention further provides a system for implementing multicast on a shared network, where the system may adopt the network architecture shown in FIG. 1.

Specifically, a system for implementing multicast on a shared network according to an embodiment of the present invention may include an office device and a plurality of terminal devices, where the office device is connected to the plurality of terminal devices in the point-to-multipoint manner through the splitter.

The office device may be configured to update an entry corresponding to a multicast program requested by a terminal device in a table of correspondence between multicast program information and terminal device identifiers according the multicast program request from the terminal device, where the table of correspondence between multicast program information and terminal device identifiers includes a plurality of relation entries, and each entry corresponds to a different multicast program and includes identifier information of terminal devices that request the multicast program; and provide the multicast program and the identifier information of terminal devices in the updated entry for each terminal device in the broadcast manner.

The terminal device may be configured to determine whether it needs to receive a multicast program provided by the office device in the broadcast manner according to the identifier information of terminal devices provided by the office device.

Specifically, the identifier information of terminal devices in the entry may be the terminal ID mask information as described in the foregoing method embodiment, where the terminal ID mask information includes a plurality of bits that respectively corresponds to different terminal devices on the shared network, and each bit is used to indicate whether a corresponding terminal device requests playing of the multicast program.

In an embodiment, terminal ID mask information corresponding to the multicast program may be encapsulated in a multicast data packet that bears the multicast program and be sent to each terminal device in the broadcast manner; or, in another embodiment, the terminal ID mask information and the multicast program are respectively borne in a multicast user notification packet that carries a multicast program number and in multicast data packets, and are sent to each terminal device in the broadcast manner.

Additionally, the office device may further be configured to add a multicast flag to the multicast data packet, where the multicast flag is predefined by the office device and the terminal devices and is used to indicate that a packet that contains the multicast flag is a multicast packet.

It should be understood that, in the system according to the embodiment of the present invention, for the process of implementing multicast by the office device and the terminal devices, references may be made to the description in the foregoing method embodiment, and the details are not described herein again.

It may be seen from the above description that, a system for implementing multicast on a shared network according to an embodiment of the present invention may also realize advantages, such as convenience in service management, reducing bandwidth occupied by multicast services, simple device chip, and low cost.

Figures 11, 12:
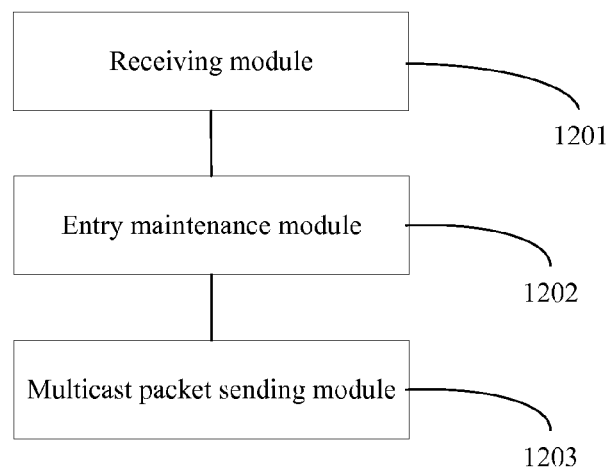
FIG. 11 is a schematic structural diagram of a multicast notification packet sent by an office device to a terminal device in the broadcast manner in the method for implementing multicast on a shared network in FIG. 10.
FIG. 12 is an apparatus for implementing multicast on a shared network according to an embodiment of the present invention.

Based on the method and the system for implementing multicast on a shared network according to the foregoing embodiments, an embodiment of the present invention further provides an apparatus for implementing multicast on a shared network. The apparatus may be an office device on a shared network, as shown in FIG. 12, and may include a receiving module 1201, an entry maintenance module 1202, and a sending module 1203.

The receiving module 1201 is configured to receive a multicast program request from a terminal device.

The entry maintenance module 1202 is configured to update an entry corresponding to the multicast program requested by the terminal device in a table of correspondence between multicast program information and terminal device identifiers according the multicast program request, where the table of correspondence between multicast program information and terminal device identifiers includes a plurality of relation entries, and each entry corresponds to a different multicast program and includes identifier information of terminal devices that request the multicast program.

The sending module 1203 is configured to provide the multicast program and the identifier information of terminal devices in the updated entry for each terminal device in the broadcast manner, where the identifier information of terminal devices is used to indicate whether each terminal device needs to receive the multicast program.

Specifically, the identifier information of terminal devices in the entry may be the terminal ID mask information, where the terminal ID mask information includes a plurality of bits that respectively corresponds to different terminal devices on the shared network, and each bit is used to indicate whether a corresponding terminal device requests playing of the multicast program.

In an embodiment, the apparatus may further include an information obtaining module and an information adding module, where the information obtaining module is configured to obtain terminal ID mask information corresponding to the multicast program from the updated entry, the information adding module is configured to add the terminal ID mask information obtained by the information obtaining module to a multicast data packet that bears the multicast program, and the sending module sends the multicast data packet with the terminal ID mask information added to each terminal device in the broadcast manner.

In another embodiment, the terminal ID mask information and the multicast program are respectively borne in a multicast user notification packet that carries a multicast program number and in multicast data packets, and are sent to each terminal device in the broadcast manner.

For example, the apparatus may further include an information obtaining module, an encapsulating module, and an information adding module, where the information obtaining module is configured to obtain terminal ID mask information corresponding to the multicast program from the updated entry, the encapsulating module is configured to encapsulate the multicast program number of the multicast program and the terminal ID mask information obtained by the information obtaining module in a multicast user notification packet, the information adding module is configured to add the terminal ID mask information obtained by the information obtaining module to a multicast data packet that bears the multicast program, and the sending module sends the multicast user notification packet and the multicast data packet with the terminal ID mask information added to each terminal device in the broadcast manner. Specifically, the sending module sends the multicast user notification packet to each terminal device periodically in the broadcast manner or to each terminal device in real time in the broadcast manner when the entry in the table of correspondence between multicast program information and terminal device identifiers is updated.

Furthermore, the information adding module may be further configured to add a preset multicast flag to the multicast data packet, where the multicast flag is predefined by the terminal devices and the office device and is used to indicate that a packet that contains the multicast flag is a multicast packet.

It should be understood that, each module included in the foregoing embodiment may be a software module implemented in the chip, which may be divided only according to the function logic, but are not confined to the division method as long as the corresponding functions can be implemented. The specific names of the functional units are used only to distinguish between each other, and not intended to limit the protection scope of the present invention. Additionally, in a specific implementation scheme, for a detailed working process of each function module, reference may be made to the description in the foregoing method embodiment, and the details are not described herein again.

It may be seen from the above description and embodiment, an apparatus for implementing multicast on a shared network according to the present invention may also achieve the goal of reducing the bandwidth occupied.

Through the description of the foregoing implementation manner, a person skilled in the art may clearly understand that the present invention may be implemented by using software plus a necessary hardware platform, or entirely by using hardware. Based on such an understanding, all or a part of the technical solutions of the present invention, which contributes to the prior art, may be embodied in the form of a software product. The computer software product may be stored in a storage medium, such as a ROM/RAM, a magnetic disk, and an optical disc, and includes several instructions used to instruct a computer device (which may be a personal computer, a server, a network device, or the like) to execute the methods provided in each embodiment of the present invention or described in certain parts of the embodiments.

The foregoing descriptions are merely exemplary embodiments of the present invention, but not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A method for implementing multicast on shared network, comprising:
receiving a multicast program request from a terminal device; wherein the multicast program request comprises multicast program information and a terminal device identifier indicating the terminal device;
updating a table of correspondence between multicast program and terminal device according to the multicast program information and the terminal device identifier; wherein the table of correspondence between multicast program and terminal device comprises a plurality of entries, each entry records a correspondence between multicast program information indicating a multicast program and terminal device identifier indicating terminal devices that have requested the multicast program indicated by the multicast program information of this entry; and
broadcasting the updated table of correspondence between multicast program and terminal device and a multicast program according to the multicast program request to the terminal devices; wherein the updated table of correspondence between multicast program and terminal device is used to indicate whether a terminal device needs to receive the broadcasted multicast program,
wherein the terminal device identifier in the entry is terminal ID mask information, wherein the terminal ID mask information comprises a plurality of bits that respectively corresponds to different terminal devices on the shared network, and each bit is used to indicate whether a corresponding terminal device requests playing of the multicast program.

2. The method for implementing multicast on a shared network according to claim 1, wherein the step of broadcasting the updated table of correspondence between multicast program and terminal device and a multicast program according to the multicast program request to the terminal devices comprises:
adding the terminal ID mask information corresponding to the broadcasted multicast program to a multicast data packet that bears the multicast program; and
broadcasting the multicast data packet with the terminal ID mask information added for each terminal device.

3. The method for implementing multicast on a shared network according to claim 1, wherein the terminal ID mask information and the multicast program are respectively borne in a multicast user notification packet that carries a multicast program number and in multicast data packets, and are sent to each terminal device in the broadcast manner.

4. The method for implementing multicast on a shared network according to claim 3, wherein the step of broadcasting the updated table of correspondence between multicast program and terminal device and a multicast program according to the multicast program request to the terminal devices comprises:
numbering all multicast programs in a unified manner, so that each multicast program has a unique multicast program number;
encapsulating the multicast program number of the multicast program and the terminal ID mask information corresponding to the broadcast multicast program in a multicast user notification packet, and sending the multicast user notification packet to each terminal device in the broadcast manner; and
adding the multicast program number to a multicast data packet that bears the multicast program, and sending the multicast data packet to each terminal device in the broadcast manner.

5. The method for implementing multicast on a shared network according to claim 4, wherein the multicast user notification packet is sent to each terminal device periodically in the broadcast manner or is sent to each terminal device in real time in the broadcast manner when an entry in the table of correspondence between multicast program information and terminal device identifiers is updated.

6. The method for implementing multicast on a shared network of claim 2, further comprising:
adding a preset multicast flag to the multicast data packet, wherein the multicast flag is predefined by the terminal devices and the office device and is used to indicate that a packet that contains the multicast flag is a multicast packet.

7. A system for implementing multicast on shared network, comprising an office device and a plurality of terminal devices, wherein the office device comprises a table of correspondence between multicast program and terminal device; wherein the table of correspondence between multicast program and terminal device comprises a plurality of entries, each entry records a correspondence between multicast program information indicating a multicast program and terminal device identifier indicating terminal devices that have requested the multicast program;
wherein the office device is configured to receive a multicast program request from a terminal device; wherein the multicast program request comprises multicast program information and a terminal device identifier; update the table of correspondence between multicast program and terminal device according to the multicast program information and a terminal device identifier carried in the multicast program request; and broadcast the updated table of correspondence between multicast program and terminal device and a multicast program indicated by the multicast program information the multicast program request carried;
wherein the terminal device is configured to determine whether the terminal device needs to receive the broadcasted multicast program according to the table of correspondence between multicast program and terminal device,
wherein the terminal device identifier is terminal ID mask information, wherein the terminal ID mask information comprises a plurality of bits that respectively corresponds to different terminal devices on the shared network, and each bit is used to indicate whether a corresponding terminal device requests playing of the multicast program.

8. The system for implementing multicast on a shared network according to claim 7, wherein:
the terminal ID mask information corresponding to the multicast program is encapsulated in a multicast data packet that bears the multicast program, and is sent to each terminal device in the broadcast manner.

9. The system for implementing multicast on a shared network according to claim 7, wherein:
the terminal ID mask information and the multicast program are respectively borne in a multicast user notification packet that carries a multicast program number and in multicast data packets, and are sent to each terminal device in the broadcast manner.

10. The system for implementing multicast on a shared network according to claim 8, wherein:
the office device is further configured to add a multicast flag to the multicast data packet, wherein the multicast flag is predefined by the office device and the terminal devices and is used to indicate that a packet that contains the multicast flag is a multicast packet.

11. An apparatus for implementing multicast on shared network, comprising:
at least one processor; and
at least one memory which stores a plurality of instructions and is configured to store a table of correspondence between multicast program and terminal device, the table of correspondence between multicast program and terminal device comprises a plurality of entries, each entry records a correspondence between multicast program information indicating a multicast program and terminal device identifier indicating terminal devices that have requested the multicast program, which when the plurality of instructions are executed by the at least one processor, cause the at least one processor to execute:
receiving a multicast program request from a terminal device; wherein the multicast program request comprises multicast program information and a terminal device identifier;
updating the table of correspondence between multicast program and terminal device according to the multicast program information and a terminal device identifier carried in the multicast program request; and
broadcasting the updated table of correspondence between multicast program and terminal device and a multicast program indicated by the multicast program information the multicast program request carried, wherein the updated table of correspondence between multicast program and terminal device is used to indicate whether a terminal device needs to receive the broadcasted multicast program,
wherein the terminal device identifier is terminal ID mask information, wherein the terminal ID mask information comprises a plurality of bits that respectively corresponds to different terminal devices on the shared network, and each bit is used to indicate whether a corresponding terminal device requests playing of the multicast program.

12. The apparatus for implementing multicast on a shared network according to claim 11, wherein the at least one processor further executes:
obtaining terminal ID mask information corresponding to the multicast program from the updated entry;
adding the obtained terminal ID mask information to a multicast data packet that bears the multicast program; and
sending the multicast data packet with the terminal ID mask information added to each terminal device in the broadcast manner.

13. The apparatus for implementing multicast on a shared network according to claim 11, wherein the terminal ID mask information and the multicast program are respectively borne in a multicast user notification packet that carries a multicast program number and in multicast data packets, and are sent to each terminal device in the broadcast manner.

14. The apparatus for implementing multicast on a shared network according to claim 11, wherein the at least one processor further executes:
obtaining terminal ID mask information corresponding to the multicast program from the updated entry;
encapsulating the multicast program number of the multicast program and the obtained terminal ID mask information in a multicast user notification packet;
adding the obtained terminal ID mask information to a multicast data packet that bears the multicast program; and
sending the multicast user notification packet and the multicast data packet with the terminal ID mask information added to each terminal device in the broadcast manner.

15. The apparatus for implementing multicast on a shared network according to claim 11, wherein the at least one processor further executes sending the multicast user notification packet to each terminal device periodically in the broadcast manner or to each terminal device in real time in the broadcast manner when the entry in the table of correspondence between multicast program information and terminal device identifiers is updated.

16. The apparatus for implementing multicast on a shared network according to claim 12, wherein the adding further adds a preset multicast flag to the multicast data packet, wherein the multicast flag is predefined by terminal devices and the office device and is used to indicate that a packet that contains the multicast flag is a multicast packet.

* * * * *